No. 736,375. PATENTED AUG. 18, 1903.
W. H. FISHER.
WALL CONSTRUCTION.
APPLICATION FILED AUG. 8, 1902.
NO MODEL. 4 SHEETS—SHEET 1.

WITNESSES: INVENTOR
W. H. Fisher
By Higdon & Higdon,
Att'ys

No. 736,375. PATENTED AUG. 18, 1903.
W. H. FISHER.
WALL CONSTRUCTION.
APPLICATION FILED AUG. 8, 1902.
NO MODEL. 4 SHEETS—SHEET 2.

WITNESSES: INVENTOR
K. M. Imboden, W. H. Fisher
A. W. Hirsch By Higdon & Higdon
Attys No. 736,375. PATENTED AUG. 18, 1903.
W. H. FISHER.
WALL CONSTRUCTION.
APPLICATION FILED AUG. 8, 1902.
NO MODEL. 4 SHEETS—SHEET 3.

WITNESSES:
K. M. Imboden,
A. W. Hirsch.

INVENTOR
W. H. Fisher
By Higdon & Higdon
Attys

No. 736,375. PATENTED AUG. 18, 1903.
W. H. FISHER.
WALL CONSTRUCTION.
APPLICATION FILED AUG. 8, 1902.
NO MODEL. 4 SHEETS—SHEET 4.

WITNESSES: INVENTOR
W. H. Fisher
By Higdon & Higdon,
Attys

No. 736,375.

Patented August 18, 1903.

UNITED STATES PATENT OFFICE.

WILLIS H. FISHER, OF KANSAS CITY, MISSOURI.

WALL CONSTRUCTION.

SPECIFICATION forming part of Letters Patent No. 736,375, dated August 18, 1903.

Application filed August 8, 1902. Serial No. 118,872. (No model.)

*To all whom it may concern:*

Be it known that I, WILLIS H. FISHER, a citizen of the United States, residing at Kansas City, in the county of Jackson and State of Missouri, have invented new and useful Improvements in Wall Construction, of which the following is a specification.

My invention relates to that class of wall and other constructions in which blocks, slabs, or tiles are made of concrete or cement for the construction of buildings or walls.

My invention consists in the novel forms and constructions of these blocks, slabs, or tiles, novel and practical devices for attaching veneering blocks, slabs, or tiles to the building blocks, slabs, or tiles, novel and practical devices for attaching veneering blocks, slabs, or tiles to steel, brick, or wooden framework, devices for holding embedded fastening devices in position in the blocks while the blocks are under construction, also for forming recesses adjacent to said devices for the purpose hereinafter described, devices for joining these blocks, slabs, or tiles together and at the same time attaching them to a framework.

Figure 1:
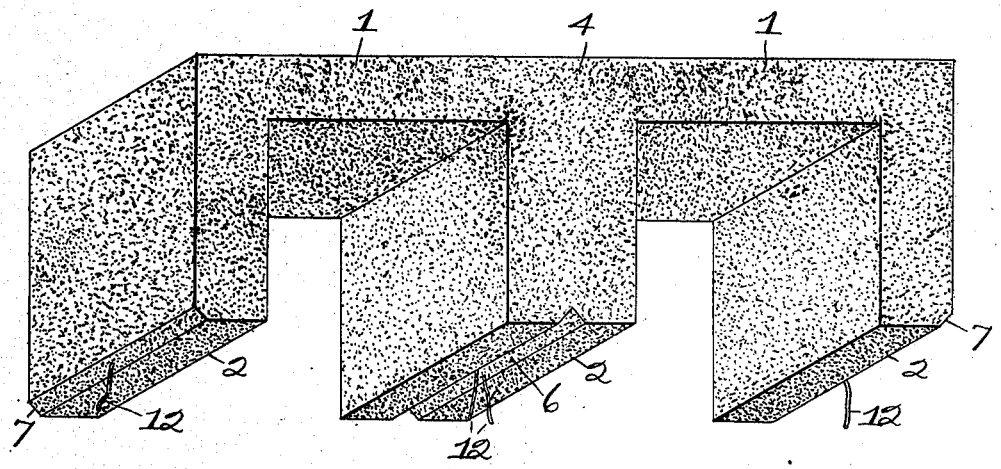
Figure 2:
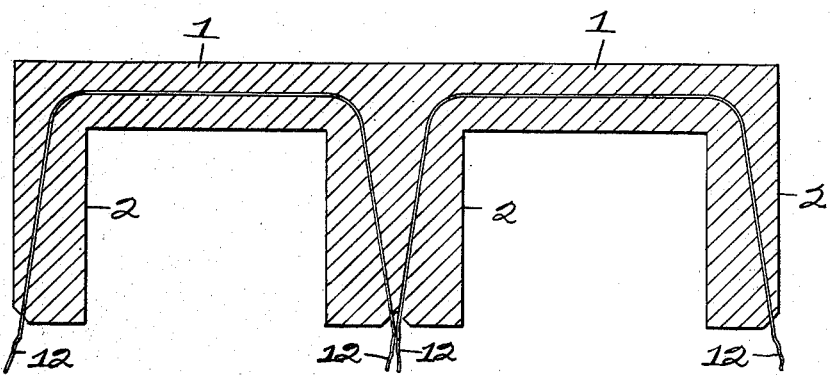
Figure 3:
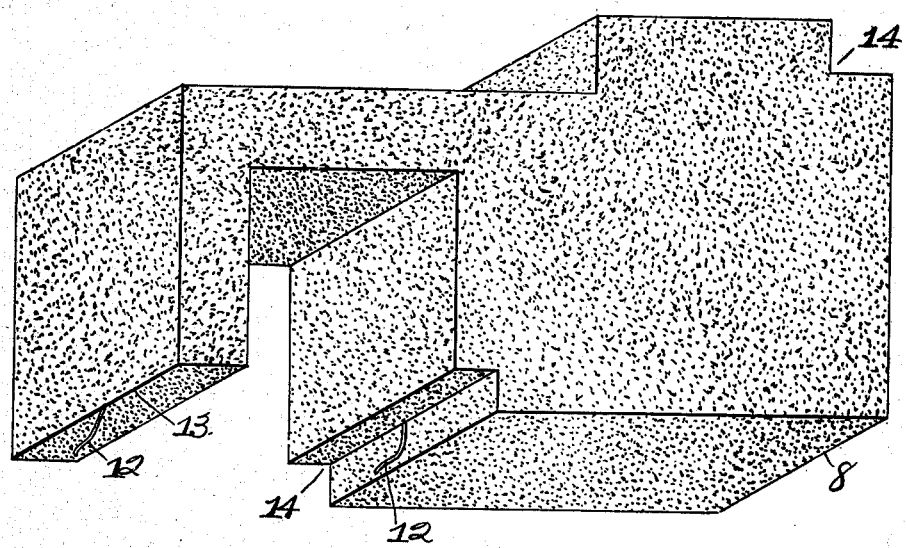
Figure 4:
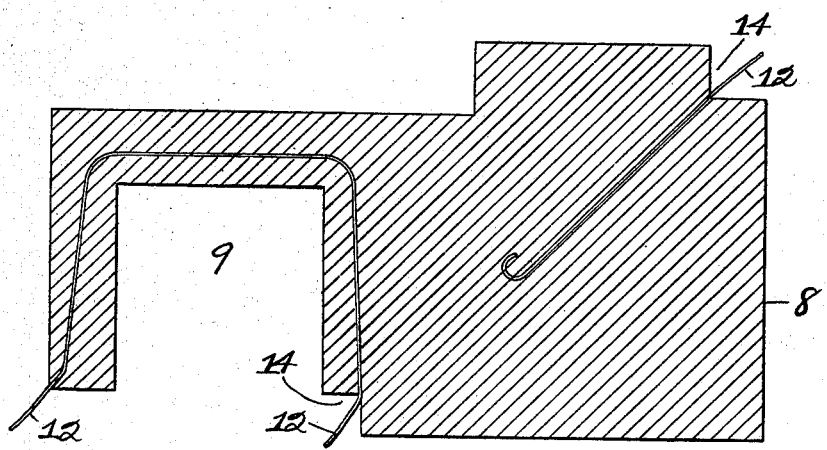
Figure 8:
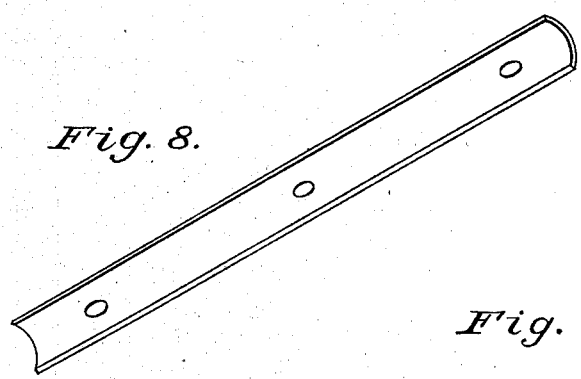
Figure 5:
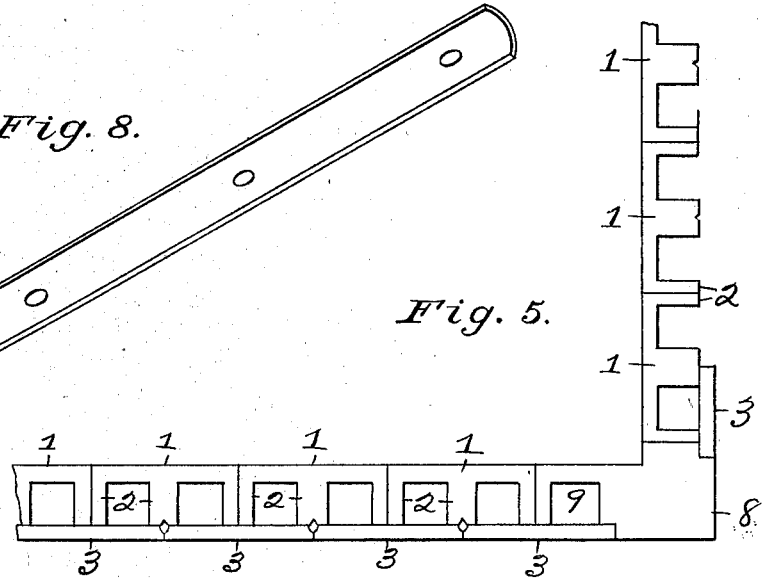
Figure 6:
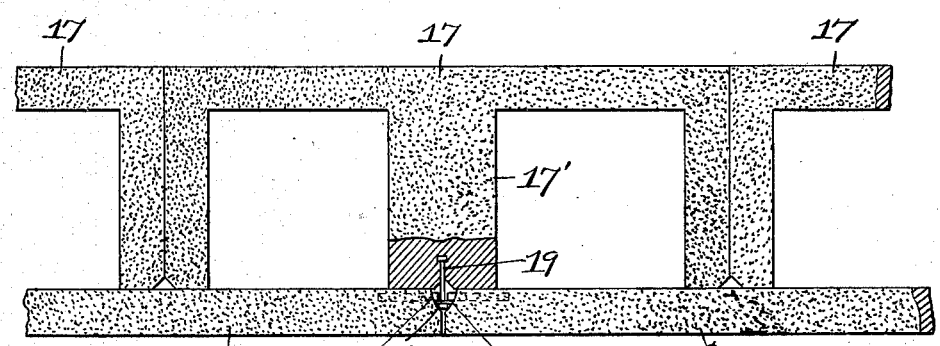
Figure 7:
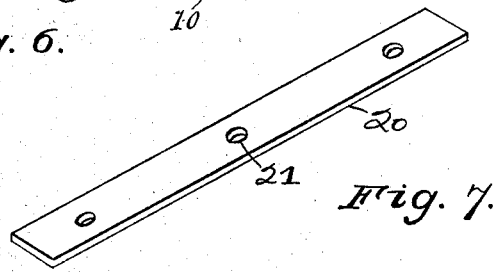
Figure 9:
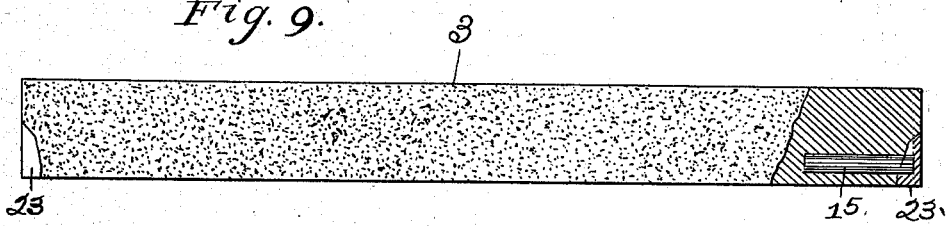
Figure 10:
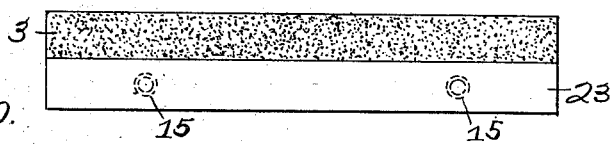
Figure 11:
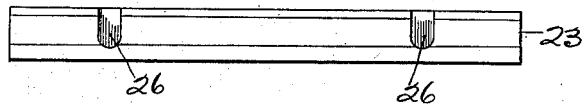
Figure 12:
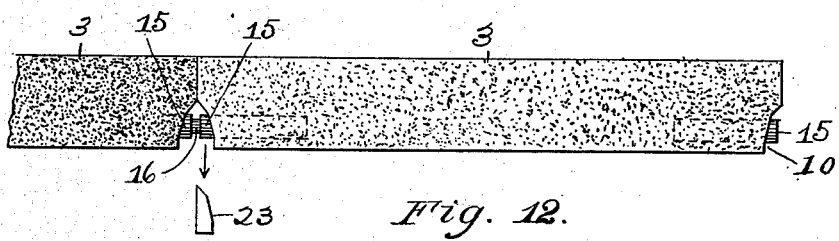
Figure 13:
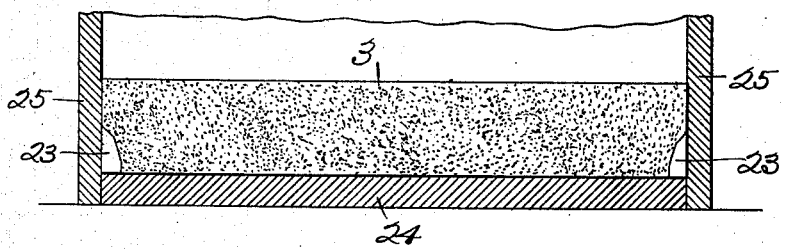

Referring now to the drawings, Figure 1 is a perspective view of a preferred form of construction-block provided with embedded wires. Fig. 2 is a longitudinal section of such a block, exposing the wires. Fig. 3 is a perspective view of a preferred form of corner construction-block having embedded wires. Fig. 4 is a section of such a corner-block, exposing the wires. Fig. 5 is a plan view of a portion of a wall constructed of the blocks shown in Figs. 1 and 3, showing also several veneering-blocks in position. Fig. 6 is an enlarged plan view of a construction-block having a modified fastening device with two veneering-blocks attached thereto. Fig. 7 is an enlarged perspective view of a portion of said fastening device. Fig. 8 is an enlarged perspective view of a modification of the piece shown in Fig. 7. Fig. 9 is a top or bottom edge view, partly in section, of a veneering-block before assembling in a wall. Fig. 10 is an end elevation of the block lying horizontally. Fig. 11 is an elevation of the inner side of one of the joint-makers. Fig. 12 is a plan view of a veneering-block and part of an adjacent block, said blocks being connected by a dowel-pin. Fig. 13 represents a veneering-block lying horizontally in its mold, the mold being in section.

Figs. 1 and 2 represent a preferred form of my angular construction-block. The body 1 of the block is provided with ribs 2, which are adapted to form, in connection with veneering-blocks 3, air-chambers in the wall, as shown in Fig. 5. The ribs 2 may be of any length, according to the thickness of wall desired. 4 is the top or bottom of the block. The middle rib 2 is made thicker than the ribs at the ends of the block, and formed in the outer face of the middle rib is a groove 6, which will be vertical when the block is in position in the wall. The outer edges of the end ribs 2 may be chamfered, as at 7.

Fig. 3 represents a corner-block 8, adapted to be employed in connection with the form of block shown in Fig. 1. This corner-block when in position forming a portion of a corner of a wall appears in plan, as shown in Fig. 5.

9 is a recess to provide an air-chamber, as shown in Fig. 5.

It will be observed that the corner-block forms one of the air-chambers of the wall and a solid corner-column which will bear greater weight without crushing than if it were constructed hollow. The external faces of these corner-blocks may be molded with designs as a trimming to brick veneerings, if desired.

Upon the wall proper, formed by the construction-blocks 1, are attached the outer or veneering blocks 3, a preferred form of which is shown in Figs. 5 and 6. Each end of each veneering-block is beveled or recessed, as shown at 10.

A variety of devices for securing the veneering-blocks to the construction-blocks may be employed. Wires 12 may be embedded in the construction-block, with their ends projecting from the grooves 6 and from the beveled edges 7 or from the grooves 6 only. In the case of the corner-blocks 8 the ends of the wire or wires might project from one of the outer edges 13 and from the inner angles of recesses 14, in which the ends of two of the veneering-blocks would be seated.

Each veneering-block will be provided with devices of some kind, so located that when the veneering-block is placed in its permanent position against the ribs of the construction-blocks the wires projecting from the latter will be adjacent to the said devices and may be attached thereto, which will secure the veneering-block in position. One of the preferred forms of such devices for the veneering-blocks is shown in Figs. 9 and 12. Embedded in each end of the veneering-block 3 are two non-metallic tubes 15. Each end of the block is recessed substantially as shown at 10, and the ends of said tubes 15 project from said recesses, as shown, but do not extend as far longitudinally as the ends of the block. Pins or dowels 16 are inserted into the tubes 15 when the blocks 3 are being built upon the wall, and the projecting wires from the construction-blocks 1 are curled around said pins 16. This is done before the ends of the two adjacent veneering-blocks are set together. When the wires are thus fastened, the next veneering-block is placed so that its tubes 15 will receive the pins or dowels 16, projecting from the adjacent block, and is pushed toward said adjacent block until their ends are in abutment, or a narrow space may be left between their ends, if preferred.

Another style of fastening device for attaching the veneering-blocks to the construction-blocks is illustrated in Figs. 6 and 8. 17 designates construction-blocks, and 3 designates veneering-blocks. The veneering-blocks are provided with the embedded tubes 15 described above. Embedded in the middle rib 17' of the construction-block 17 is a bolt 19, which projects from the outer face thereof. One of the veneering-blocks 3 is placed in position with its end about even with the bolt 19. A strip of metal 20, provided with a hole 21, which is slipped over the bolt 19, is placed with its edge against the recessed end of the block 3, outside of the tubes 15. Then a nut 22 is screwed on the end of the bolt to contact with the strip 20, but not far enough to bind upon the strip. Then the adjacent block 3 is pushed longitudinally toward the aforesaid block 3, which causes its tubes 15 to insert themselves behind the strip 20, as shown in Fig. 6. Of course two or more bolts 19 may be embedded in each rib 17', and the strips 20 may be shaped as shown in Fig. 8 instead of flat.

A feature of my invention to which I attach great importance is illustrated in Figs. 9, 10, 11, 12, and 13. The feature referred to is a wooden or metallic bar 23, two of which are used in the manufacture of each veneering-block 3. In order to explain the action of these bars 23, it is expedient to represent a small portion of a mold in which these blocks are formed and pressed.

In Fig. 13, 24 designates the bottom plate of the mold, and 25 the ends thereof. 3 is one of the fully-formed veneering-blocks in the position in which it was molded. Before the material for the block is placed into the mold two of the aforesaid bars 23 are placed in the respective ends of the mold, in the corners thereof, as shown. In each of said bars are two (or more) recesses 26, which are adapted to receive and hold firmly the ends of the short pieces of tubing 15 mentioned heretofore. In each recess 26 of each bar 23 a tube 15 is inserted in the position shown by Fig. 9. Then the soft material is placed into the mold, filling the space around said tubes and bars, and is highly compressed, (by means not shown,) forming the flat block 3. The ends of the mold are removed, and the bars 23 will of course adhere to the block by means of engaging the ends of the tubes 15. The bars 23 serve to hold the embedded tubes 15 in position in the "green" block until the block hardens. When the block has hardened sufficiently, but not until the block is in position upon a wall ready for attachment thereto, one of the bars 23 is removed from one end of the block by drawing it in the direction of the arrow in Fig. 12. The inner edge of the bar is beveled, so that it will "draw" from and will not chip the block. Thus one-half (more or less) of the end of the block is left recessed, for the purpose already described. When the other bar 23 is detached from the opposite end of the block a similar recess is left in that end of the block. The bars 23 are indispensable as means for holding the embedded tubes 15 in position after the blocks have been removed from their mold.

Having now fully described my invention, what I claim as new, and desire to secure by Letters Patent of the United States, is—

1. A construction block or tile provided with angular ribs, a groove in one of said ribs, and a fastening device embedded in the block or tile and projecting from said groove; substantially as described.

2. A construction block or tile provided with angular ribs, said ribs having beveled edges, and fastening devices embedded in the block or tile and projecting from said beveled edges; substantially as described.

3. A corner block or tile having a solid corner-body and a recessed portion, said corner-body having recesses 14 therein; substantially as described.

4. A corner block or tile having a solid corner-body and a recessed portion, said corner-body having recesses 14 therein, and fastening devices embedded in the block or tile and projecting from said recesses 14; substantially as described.

5. A veneering block slab or tile having a recess in each end thereof, and an embedded tube projecting from each said recess; substantially as described.

6. The combination with a "green" veneering block slab or tile having a recess in its end, and an embedded tube projecting from said recess, of a beveled strip or bar seated in said recess and having therein a recess adapted to hold said embedded tube in position until the block has hardened; substantially as described.

In testimony whereof I affix my signature in the presence of two witnesses.

WILLIS H. FISHER.

Witnesses:
K. M. IMBODEN,
A. W. HIRSEL.